United States Patent [19]

Suzuki

[11] Patent Number: 5,731,842
[45] Date of Patent: Mar. 24, 1998

[54] TV SIGNAL CODEC WITH AMPLITUDE LIMITATION AND A SHIFT

[75] Inventor: Norio Suzuki, Tokyo, Japan

[73] Assignee: NEC Corporation, Tokyo, Japan

[21] Appl. No.: 560,688

[22] Filed: Nov. 20, 1995

[30] Foreign Application Priority Data

Nov. 18, 1994 [JP] Japan ................................. 6-284692
Nov. 30, 1994 [JP] Japan ................................. 6-296127

[51] Int. Cl.$^6$ .................................................. H04N 7/32
[52] U.S. Cl. ............................................................ 348/409
[58] Field of Search ............................. 348/415, 409,
348/416, 402, 401, 400, 390, 384, 405;
382/252, 251, 238, 236, 233, 232; H04N 7/137

[56] References Cited

U.S. PATENT DOCUMENTS 4,334,237  6/1982  Reitmeier et al. ................. 348/405
5,488,418  1/1996  Mishima et al. ................... 348/398

OTHER PUBLICATIONS

Gert Bostelmann, "A Simple High Quality DPCM–Codec for Video Telephony Using 8 Mbit per Second", *Nachrichtentechn. Z*, 37, (1984), No. 3, pp. 115–117, (month not avail.).

*Primary Examiner*—Bryan S. Tung
*Attorney, Agent, or Firm*—Sughrue, Mion, Zinn, Macpeak & Seas, PLLC

[57] ABSTRACT

In a TV signal encoder device comprising, for encoding a digital TV signal into an encoder device output signal, both having a predetermined dynamic range, an amplitude limiter, a predictive encoder unit for predictive encoding with quantization an amplitude limited signal of a limited dynamic range into a quantized signal having together with quantization noise the predetermined dynamic range, and a code converter for code converting the quantized signal into the device output signal, a forward offset circuit adaptively gives a forward shift to the TV signal so as to avoid undesirable clipping of tip ends of synchronizing signals in the amplitude limited signal. The forward shift and a lower and a higher range reduction of the predetermined dynamic range into the limited dynamic range are preferably equal to a maximum quantization noise level. Instead of the offset circuit, use of an encoder dynamic range defining circuit is more preferred. In this event, a TV signal decoder device comprises instead an inverse offset circuit a decoder dynamic range defining circuit and a level converter.

15 Claims, 6 Drawing Sheets

TV SIGNAL CODEC WITH AMPLITUDE LIMITATION AND A SHIFT

BACKGROUND OF THE INVENTION

This invention relates to predictive encoding and decoding of an input digital TV (television) signal and, more particularly, to predictive encoding and decoding of the TV signal with symmetric quantization. In other words, this invention relates to a TV signal encoding and decoding method of the type described. In addition, this invention relates to a TV signal encoder device and a TV signal decoder device for implementing the TV signal encoding and decoding method.

In the manner which will later be described in greater detail, a differential pulse code modulation (DPCM) encoder device for a TV signal is known and is supplied with an input digtial TV signal having a predetermined dynamic range between lowest and highest original or input levels. The input digital TV signal comprises an input video signal and synchronizing signals.

In this conventional TV signal encoder device, the input digital TV signal is delivered to a predictive encoder unit as an encoder unit input signal. The predictive encoder unit predictive encodes the encoder unit input signal with quantization into a quantized signal. For this purpose, a prediction difference or error signal is produced in the predictive encoder unit by calculating a difference between a current input sample of the video signal and a predicted sample produced in response to the quantized signal to predict the current input sample. A quantizer quantizes the prediction difference signal into the quantized signal. Due to the quantization, the quantized signal is accompanied inevitably by quantization noise having in absolute value a maximum quantization noise level.

The prediction difference signal and consequently the quantizer must therefore has a wider dynamic range which is wider than the predetermined dynamic range. This wider dynamic range has been indispensable in order to achieve a high signal to noise ratio (S/N) and an excellent overload characteristic as a result of reducing the quantization noise in a flat portion of the prediction difference signal and a deterioration resulting from an overload both sufficiently intangible.

In the meantime, an improvement is disclosed by Gert Bostelmann in German Patent No. 2,405,534 and in his article contributed to the Nachrichtentechn. Z. 37 (1984), No. 3, pages 115 to 117, under the title of "A Simple High Quality DPCM Codec for Video Telephony Using 8 Mbit per Second". In this Bostelmann encoder device, the prediction difference signal and consequently the quantizer need not have the wider dynamic range but as narrow as the predetermined dynamic range.

In the Bostelmann encoder device, an amplitude limiter is used to amplitude limit the input digital TV signal into an amplitude limited signal having a limited dynamic range between lowest and highest limited levels which are equal to the lowest original level plus the maximum quantization noise level and to the highest original level minus the maximum quantization noise level. As the encoder unit input signal, the amplitude limited signal is delivered to the predictive encoder unit which is operable like in the conventional encoder device. The quantized signal has the predetermined dynamic range and is for use as an encoder device output signal.

In a Bostelmann decoder device, the encoder device output signal is used as a decoder device input signal having the predetermined dynamic range. A predictive decoder predictive decodes the decoder device input signal into a predictive decoded signal having the predetermined dynamic range. The predictive decoded signal is used as a decoder device output signal and is for use as a reproduction of the input digital TV signal.

It has been confirmed by Bostelmann both theoretically and experimentally that the Bostelmann improvement provides high quality encoder and decoder devices with a very little additional implementation expense. It has, however, been found by the present inventor that the amplitude limiter gives rise to undesirable clipping of tip ends of horizontal synchronizing signals included in the input digital TV signal and to unpleasant results in reproduced pictures reproduced from the decoder device output signal.

SUMMARY OF THE INVENTION

It is consequently an object of the present invention to provide a television signal encoding and decoding method of the type of the Bostelmann improvement described in the foregoing, in which not clipped are tip ends of horizontrol synchronizing signals and which achieves a high quality picture reproduction with no overload introduced by quantization.

It is another object of this invention to provide a television signal encoding and decoding method which is of the type described and which can fully use a predetermined dynamic range of an input television signal in encoding the input television signal with quantization into a quantized signal.

It is still another object of this invention to provide a television signal encoder device for use in implementing an encoding part of the television signal encoding and decoding method of the type described.

It is yet another object of this invention to provide a television signal decoder device for implementing a decoding part of the television signal encoding and decoding method of the type described.

Other objects of this invention will become clear as the description proceeds.

In accordance with an aspect of this invention, there is provided a television signal encoding and decoding method comprising on an encoding side the steps of: (a) dealing with an input digital television signal having a predetermined dynamic range between lowest and highest original levels to produce an amplitude limiting stage input signal, (b) amplitude limiting the amplitude limiting stage input signal into an amplitude limited signal having a limited dynamic range between lowest and highest limited levels, and (c) predictive encoding the amplitude limited signal with quantization into a quantized signal accompanied by quantization noise having a maximum quantization noise level to have altogether the predetermined dynamic range for use as an encoding side output signal, and comprising on a decoding side the steps of: (d) receiving the encoding side output signal as a decoding side input signal having the predetermined dynamic range, (e) predictive decoding the decoding side input signal into a predictive decoded signal having the predetermined dynamic range, and (f) dealing with the predictive decoded signal to produce a decoding side output signal having the predetermined dynamic range for use as a reproduction of the input digital television signal, wherein (A) the television signal dealing step adaptively gives a forward shift to the input digital televsion signal to keep a lowest level of the amplitude limited signal at the lowest limited level and to make the encoding side output signal have the predetermined dynamic range subjected to the forward shift; (B) the predictive decoded signal dealing step producing the decoding side output signal in the predetermined dynamic range with the forward shift removed.

In accordance with a different aspect of this invention, there is provided a television signal encoder device comprising: (a) delivering means for delivering as a limiter input signal an input digital television signal having a predetermined dynamic range between lowest and highest original levels, (b) an amplitude limiter for amplitude limiting the limiter input signal into an amplitude limited signal having a limited dynamic range between lowest and highest limited levels, and (c) a predictive encoder unit for predictive encoding the amplitude limited signal with quantization into a quantized signal accompanied by quantization noise having a maximum quantization noise level to have altogether the predetermined dynamic range for use as an encoder device output signal, wherein the delivering means adaptively gives a forward shift to the input digital television signal to keep a lowest level of the amplitude limited signal at the lowest limited level and to make the encoder device output signal have the predetermined dynamic range subjected to the forward shift.

In accordance with another different aspect of this invention, there is provided a television signal decoder device for decoding a decoder device input signal which is produced as an encoder device output signal by a television signal encoder device comprising: (a) delivering means for delivering as a limiter input signal an input digital television signal having a predetermined dynamic range between lowest and highest original levels, (b) an amplitude limiter for amplitude limiting the limiter input signal into an amplitude limited signal having a limited dynamic range between lowest and highest limited levels, and (c) a predictive encoder unit for predictive encoding the amplitude limited signal with quantization into a quantized signal accompanied by quantization noise having a maximum quantization noise level to have altogether the predetermined dynamic range for use as the encoder device output signal and into a local decoded signal, the television signal decoder device comprising: (d) a predictive decoder for predictive decoding the decoder device input signal to produce a reproduction of the local decoded signal as a predictive decoded signal having the predetermined dynamic range, and (e) processing means for processing the predictive decoded signal into a decoder device output signal, the dealing means adaptively giving a forward shift to the input digital television signal to keep a lowest level of the amplitude limited signal at the lowest limited level and to make the encoder device output signal have the predetermined dynamic range subjected to the forward shift, wherein the processing means produces the decoder device output signal in the predetermined dynamic range as a reproduction of the input digital television signal with the forward shift removed.

DESCRIPTION OF THE PREFERRED EMBODIMENTS

Figure 1:
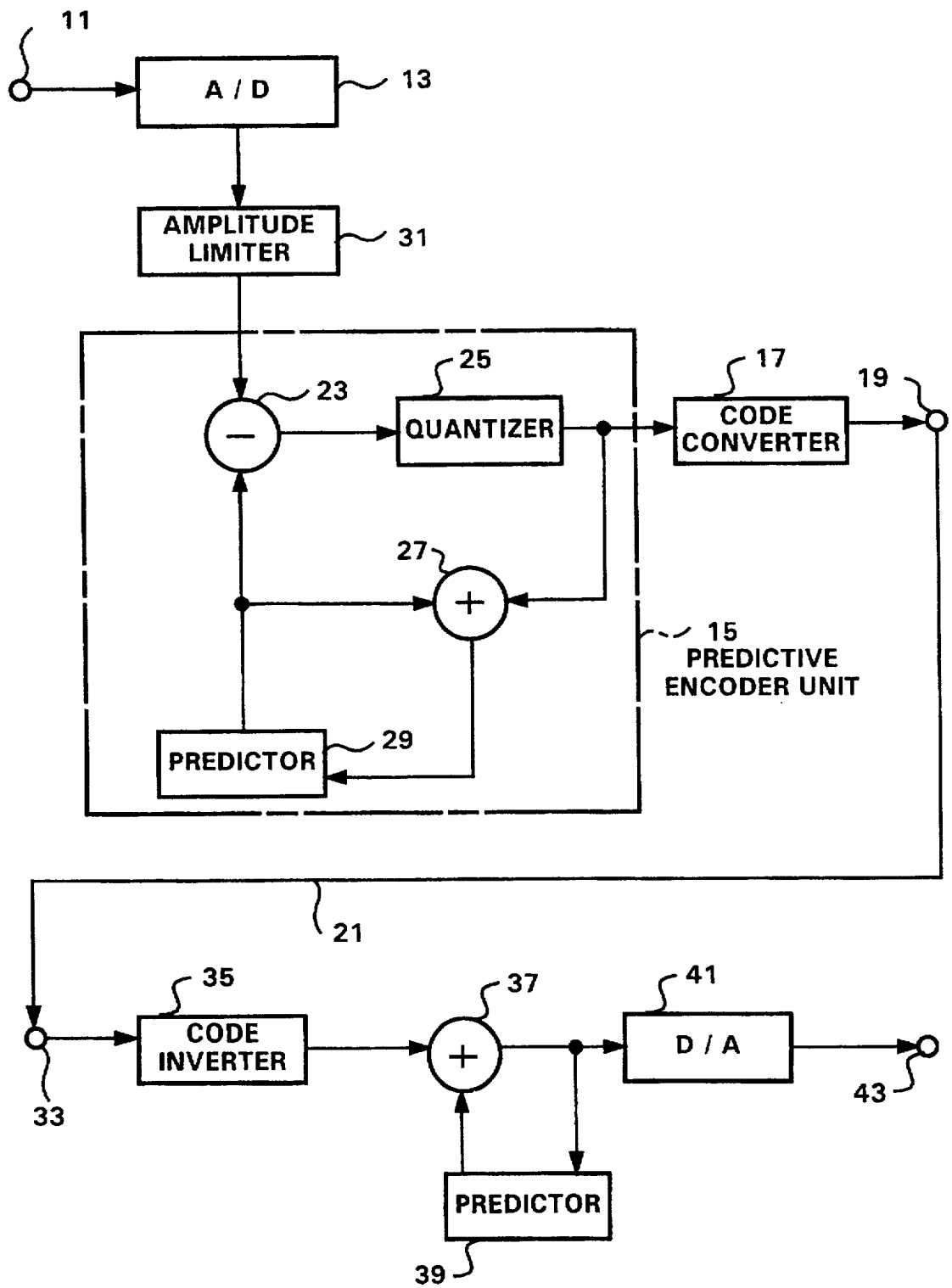
FIG. 1 is a block diagram of conventional television signal encoder and decoder devices.

Referring to FIG. 1, a conventional differential pulse code modulation (DPCM) encoder device will first be described in order to facilitate an understanding of the present invention. Immediately following, FIG. 1 will continuously be referred to in describing a Bostelmann improvement thereon and a DPCM decoder device as revealed in the German Patent and the Bostelmann article cited hereinabove.

Such an encoder device has an encoder device input terminal 11 supplied with an anolog TV (Television) signal as an input TV signal. From the encoder device input terminal 11, the input TV signal is delivered to an analog-to-digital (A/D) converter 13 and is converted to a pulse code modulated (PCM) signal. As usual, such a TV signal comprises a video signal representative of original pictures and horizontal and vertical synchronizing signals which are indispensable for reproduction of the original pictures. In the PCM signal, a PCM video signal is a digital television signal of successive input samples X, each represented by n bits, where n represents a predetermined natural number, such as eight.

In the conventional encoder device, the PCM signal is delivered directly to a predictive encoder unit 15 as an encoder unit input signal. Predictive encoding the PCM video signal of the encoder unit input signal with quantization, the predictive encoder unit 15 produces a quantized signal.

Code converting the quantized signal, a code converter 17 produces a code converted signal comprising output codewords on which the synchronizing signals are supersoped together with other information which will be described as the description proceeds. The code converter 17 delivers such a multiplexed signal to an encoder device output terminal 19 and thence either to a transmission path or a recording medium 21 as an encoder device output signal.

The predictive encoder unit 15 comprises a subtracter 23 supplied with the encoder unit input signal and with a subtrahend signal to produce a prediction difference or error signal. Supplied with the prediction difference signal as a quantizer input signal, a quantizer 25 quantizes the quantizer input signal into the quantized signal in accordance with a quantizing characteristic. The quantizer 25 delivers the quantized signal to the code converter 17 and furthermore to an encoding adder 27. Supplied additionally with an encoder addend signal, the encoding adder 27 produces a local decoded signal.

Responsive to the local decoded signal, an encoding predictor 29 produces an encoder predicted signal. From the encoding predictor 29, the encoder predicted signal is delivered to the subtracter 22 as the subtrahend signal and to the encoding adder 27 as the encoder addend signal.

In the PCM video signal, one of the successive input samples will be taken into consideration at a time instant i and will be referred to as a current input sample $x(i)$. At a preceding time instant $(i-1)$ which may be one sampling interval earlier, another of the successive input samples will be referred to as a previous input sample $x(i-1)$.

The local decoded signal comprises successive local decoded samples Y. The encoding predictor 29 may predict in the encoder predicted signal the current input sample in response to one of the successive local decoded samples. This one of the successive local decoded sample will therefore be referred to as a previous local decoded sample y(i−1). Succeeding the previous local decoded sample, another of the local decoded samples will be referred to as a current local decoded sample y(i).

It should be noted in connection with the above that various manners of prediction are known. It will be presumed merely for simplicity of the description that the encoding predictor 29 is operable in the manner described in the foregoing unless otherwise positively mentinod.

When each of the successive input samples is represented by eight bits as a sample of eight-bit video signal, the encoder unit input signal has an original or predetermined dynamic range between levels "0" and "255" or between levels "−128" and "127" which are herein called lowest and highest original or input levels X(L) and X(H). The quantized signal is unavoidably accompanied by quantization noise which has a maximum quantization noise level K with plus and minus signs. Due to the quantization noise, the prediction difference signal and consequently the quantizer 25 must have a wider dynamic range which is at least (n+1) or nine bits wide. This wider dynamic range has been indispensable in order to achieve a high signal to noise ratio (S/N) and an excellent overload characteristic. That is, the wider dynamic range has been necessary in order to render the quantization noise in a flat portion or area of the prediction difference signal and a deterioration caused by overload in reproduced pictures both intangible.

In a Bostelmann encoder device according to the Bostelmann improvement, it is sufficient for the quantizer 25 to have the original dynamic range, namely, at most a half of the wider dynamic range. This has been made possible by using an amplitude limiter 31 between the A/D converter 13 and the predictive encoder unit 15 and by making the quantizer 25 carry out "symmetric" quantization as called in the Bostelmann article.

More particularly, the symmetric quantization will be described with an assumption such that the prediction difference signal is of n bits, namely, an n-bit digital signal. In this event, the quantization characteristic defines $2^n$ levels as a zeroth or lowest through a $(2^n-1)$-th or highest quantization levels and is symmetric around or on both lower and higher sides of a $2^{(n-1)}$-th quantization level.

The quantizer 25 gives one of the lowest to the highest quantization levels at a time to the quantized signal as a quantization output level to the quantizer input signal of positive input levels and of a $2^n$ complements of the quantizer input signal of negative input signal levels. Processing the quantized signal, the code converter 17 produces first to $(2^n-1)$-th codewords in connection with the PCM video signal included in the PCM signal. In the multiplexed signal, a $2^n$-th codeword is used to represent the synchronizing signals.

In correspondence to the symmetric quantization, the amplitude limiter 31 amplitude limits on original or input amplitude of the PCM signal to a limited amplitude by excluding both ends of the original amplitude in correspondence to the maximum quantization noise level K. In other words, the amplitude limiter 31 produces an amplitude limited signal having a limited dynamic range between lowest and highest limited levels which are equal to the lowest original level plus the maximum quantization noise level and to the highest original level minus the maximum quantization noise level.

Responsive to the encoder unit input signal which is now the amplitude limited signal, the subtracter 23 subtracts the subtrahend signal from the amplitude limited signal modulo n bits to produce the prediction difference signal of n bits with plus and minus sign bits omitted. The encoding adder 27 calculates a sum of the quantized signal and the encoder addend signal modulo n bits. In this manner, the quantized signal is given the original dynamic range. The local decoded signal has also the original dynamic range.

For use in combination with the Bostelmann encoder device, a Bostelmann decoder device has a decoder device input terminal 33 supplied with a decoder device input signal. Either delivered through the transmission path 21 or reproduced from the recording medium 21, the encoder device output signal is used as the decoder device input signal.

Connected to the decoder device input terminal 33, a code inverter 35 deals with the decoder device input signal to produce a code inverted signal by code inversion which is an inverse of code conversion carried out by the code converter 17. The code inverted signal is therefore a reproduction of the quantized signal and has the original dynamic range.

Connected to the code inverter 35, a decoding adder 37 is for adding a decoder addend signal to the code inverted signal modulo n bits to produce a sum signal. Responsive to the sum signal, a decoding predictor 39 produces a decoder predicted signal for delivery back to the decoding adder 37 as the decoder addend signal. Calculated modulo n bits, the sum signal has the original dynamic range. The decoder predicted signal is also an n-bit digital signal.

The sum signal is a predictive decoded signal which is a reproduction of the local decoded signal produced in the predictive encoder unit 15. Connected to the decoding adder 37, a digital-to-analog (D/A) converter 41 serves as a processing unit for processing the predictive decoder signal as a doceder device output signal into a reproduction of the analog TV signal for delivery to a decoder device output terminal 43.

It is possible to understand a combination of the decoding adder 37 and the decoding predictor 39 as a predictive decoder responsive to the reproduction of the quantized signal for producing the predictive decoded signal. It is also possible to understand that the predictive decoder additionally comprises the code inverter 35 and is responsive to the decoder device input signal to produce the predictive decoded signal.

The Bostelmann improvement uses addition and subtraction modulo n bits without regard to an overflow and an underflow. The amplitude limiter 31 prevents the subtracter 23 and the encoding and the decoding adders 27 and 37 from falling into the overflow and the underflow.

Although the Bostelmann improvement is excellently operable, it has been found by the present inventor that the amplitude limiter 31 gives rise to undesirable clipping of tip ends of the horizontal synchronizing signals. This fact will be described in greater detail in the following.

It will be surmised according to the CCIR Recommendation No. 601 when an eight-bit video signal varies in a 256-step level range between levels "0" and "255" that black and white levels are set at levels "16" and "235". In a plus and minus level range between the above-mentioned lowest and highest original levels X(L) and X(H) of "−128" and "127", the black and the white levels are given levels "112" and "107". When the maximum quantization noise level K has an absolute value of eighteen levels, the amplitude limiter 31 clips the black level at the lowest limited level of "−112" to undesirably gives rise to a loss of two levels at each tip end of the horizontal synchronizing signals.

The vertical synchronizing signals also have a lowest level of a blacker than black level lower than the lowest limited level like the horizontal synchronizing signals. The horizontal synchronizing signals are consequently typical representative of the horizontal and the vertical synchronizing signals. If the maximum quantization noise level is higher, the amplitude limiter 31 clips the tip ends more seriously. In this manner, the amplitude limiter 31 undesirably clips both top and bottom ends of a test signal sinusoidally variable between the lowest and the highest original levels to gives rise to a waveform distortion and other inconveniences to the test signal.

Figure 2:
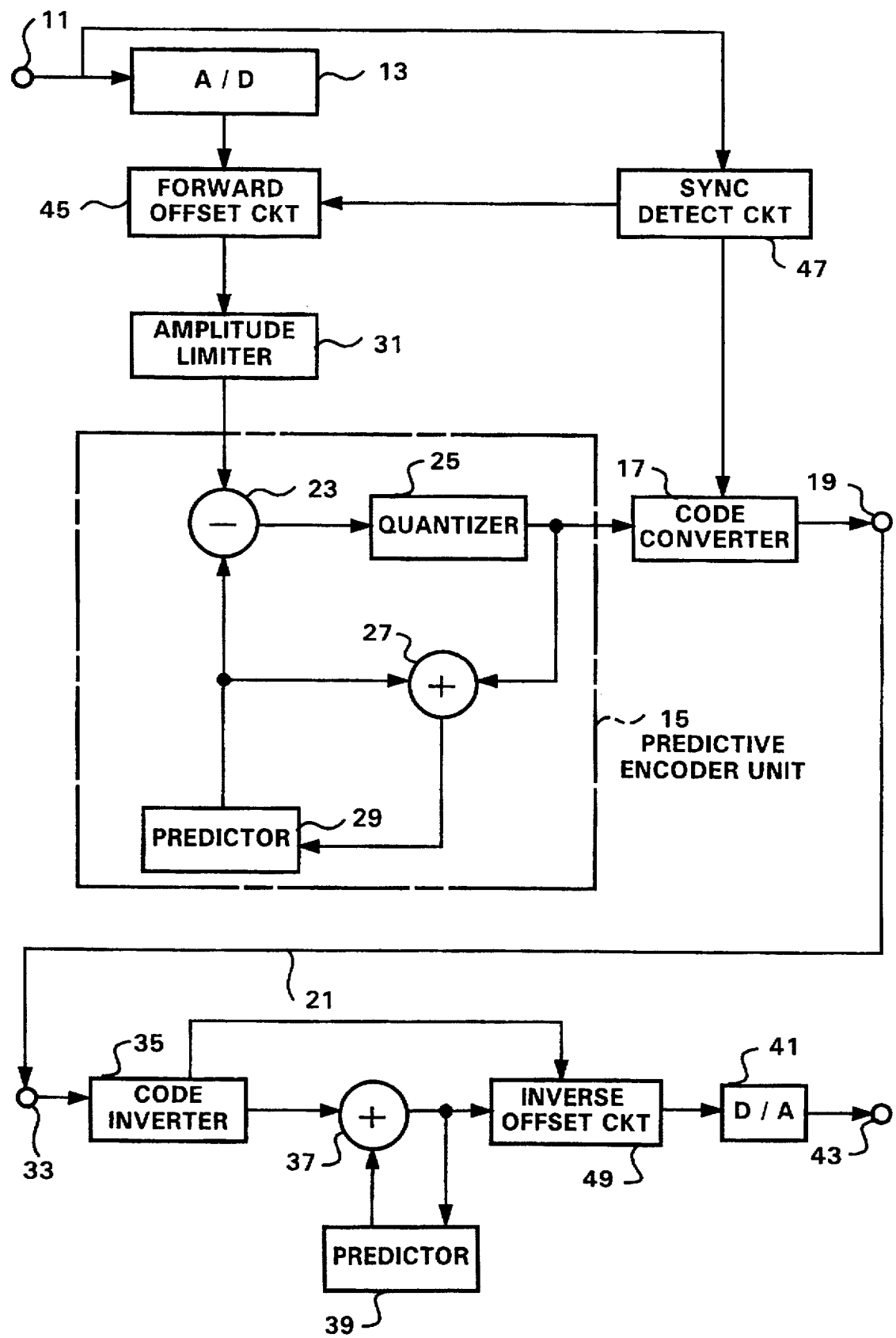
FIG. 2 is a block diagram of television signal encoder and decoder devices according to a first embodiment of the instant invention.

Referring now to FIG. 2 with FIG. 1 additionally referred to, television signal encoder and decoder devices are according to a first preferred embodiment of this invention. Similar parts are designated by like reference numerals as usual and are similarly operable with likewise named signals and with likewise named samples and ranges or levels.

The television signal encoder device comprises a forward offset circuit 45 between the A/D converter 13 and the predictive encoder unit 15. Supplied with the analog TV signal from the encoder device input terminal 11, a synchronism detecting circuit 47 detects horizontal synchronizing signal intervals or horizontal scan intervals of the horizontal synchronizing signals and delivers a horizontal synchronizing signal interval signal representative of the horizontal synchronizing signal intervals to the forward offset circuit 45 and to the code converter 17. The television signal decoder device comprises an inverse offset circuit 49 having first and second circuit input terminals connected to the code inverter 35 and to the decoding adder 37 and is connected to the D/A converter 41.

It will now be presumed that the analog TV signal is an NTSG color TV signal and that the A/D converter 13 samples the analog TV signal into the PCM signal with a sampling frequency which is three times as high as a color subcarrier frequency. In any event, it will be presumed that the PCM signal comprises the video signal of eight bits and that the successive input samples X are variable between the lowest and the highest original levels X(L) and X(H) of the levels "−128" and "127".

Responsive to the horizontal synchronizing signal interval signal delivered from the synchronism detecting circuit 47. The forward offset circuit 45 adds a predetermined offset signal of a forward offset level to each horizontal synchronizing signal of the PCM signal delivered from the A/D converter 13. The predetermined offset signal is given a predetermined signal form which is, for example, a rectangular waveform having the maximum quantization noise level. Alternatively, the predetermined signal form is a trapezoidal form having gradually rising leading and falling trailing ends in each horizonal synchronizing signal interval.

Like the Bostelmann encoder device, the amplitude limiter 31 delivers the amplitude limited signal to the predictive encoder unit 15 or to the subtracter 23 as the encoder unit input signal. In the encoder unit input signal, the successive input samples have a sample interval variable between the lowest and the highest limited levels. The horizontal synchronizing signals are variable between the lowest limited level plus the maximum quantization noise level and the highest limited level as it stands.

For the quantizer input signal having the original dynamic range, namely, between the lowest and the highest original levels, an amplitude will be taken into consideration such that the quantization characteristic is governed by a companding law to be symmetric around the zero quantization level and to define fifteen quantization levels of 0 and of absolute values of 1, 3, 5, 11, 21, 33, and 36 and that the quantizer input signal is quantized into the quantized level of four bits with an input signal threshold value selected at an intermediate level between two consecutive quantization levels. Under the circumstances, the maximum quantization noise level has the above-mentioned absolute value of eighteen levels.

In any event, the forward offset circuit 45 produces a forward offset or shifted signal of a forward offset dynamic range between lowest and highest offset levels which are equal to the forward offset level plus the lowest and the highest original levels.

The forward offset signal is delivered to the amplitude limiter 31 as the limiter input signal. When the forward offset level has a height of two levels, the horizontral synchronizing signals have in the forward offset signal a lowest level of "−110" which is equal to the lowest limited level. The tip ends of the horizontal synchronizing signals are no more clipped in the amplitude limited signal.

The forward offset circuit 45 may give a variation in an actual duration of each horizontal synchronizing signal interval. In order to cope with the variation, the code converter 17 is supplied with the synchronizing signal interval signal from the synchronism detecting circuit 47 to encode the actual duration as by run length encoding into an output interval signal representative of the actual duration in the encoder device output signal. Incidentally, the encoding predictor 29 may predict in the NTSC color TV signal sampled at three times the color subcarrier frequency the current input sample x(i) by a prediction function such that:

$$P(Z-1)=0.5Z-1+Z-3-0.5Z-4,$$

where Z represents the Z transom of the previous input sample x(i−1).

In the television signal decoder device, the code inverter 35 reproduces from the decoder device input signal the output interval signal as a received interval signal representative of the actual duration or, more precisely, the actual duration in the predictive decoded signal, for delivery to the first circuit input terminal of the inverse offcet circuit 49. The code inverter 35 reproduces from the decoder device input signal the synchronizing signals as reproduced synhronizing signals for delivery to the decoding adder 37 and thence as intermittent parts of the predictive decoded signal to the second circuit input terminal of the inverse offset circuit 49. In the predictive decoded signal, the received interval signal indicates intermittent durations of the reproduced synchronizing signals or, more precisely, corresponding intervals corresponding to the sychronizing signal intervals during which the predetermined offset signal is added to the PCM signal in the television signal encoder device.

Responsive to the received interval signal, the inverse offset circuit 49 subtracts the predetermined offset signal of the forward offset level from the reproduction of the synchronizing signals. The D/A converter 41 produces the decoder device output signal in which the horizontal synchronizing signals are exempted from the forward shift.

Figure 3:
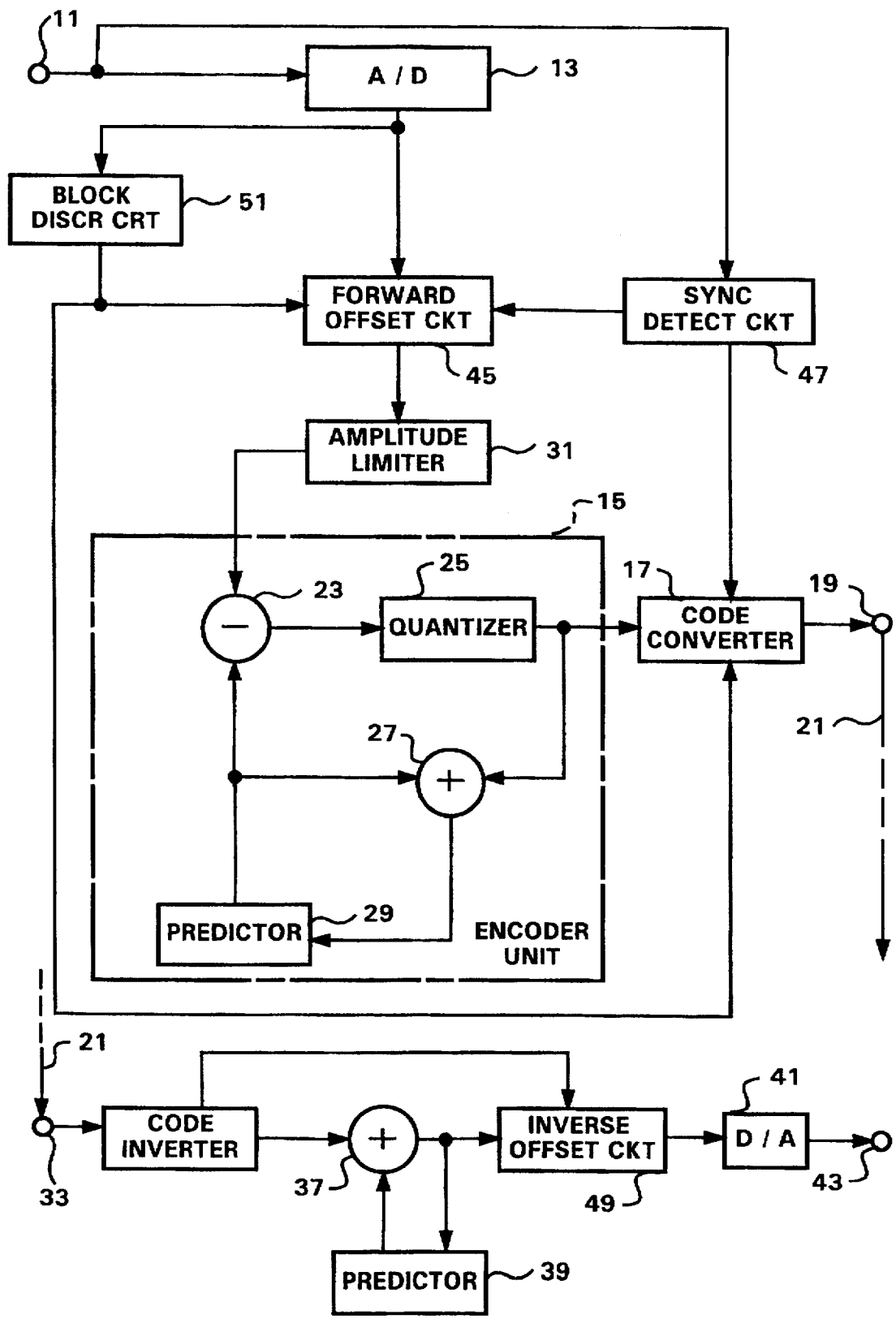
FIG. 3 is a block diagram of television signal encoder and decoder devices according to a second embodiment of this invention.

Turning to FIG. 3 with FIGS. 1 and 2 once more referred to, attention will be directed to television signal encoder and decoder devices according to a second preferred embodiment of this invention. Similar parts are again designated by like reference numerals and are similarly operable with likewise named signals and likewise named samples and ranges or levels.

The television signal encoder device additionally comprises a block discriminating circuit 51 connected to the A/D converter 13 and connected to the forward offset circuit 45 and to the code converter 17. In compliance with this addition of the block discriminating circuit 51, the forward offset circuit 45 and the code converter 17 are somewhat differently operable. The code inverter 35 and the inverse offset circuit 45 are a little differently operable. With such modifications, it is rendered possible to prevent the amplitude limiter 31 from undesirably clipping the PCM video signal at its peak or greatest levels. It may be mentioned here in this connection that the PCM signal includes the PCM video signal in video signal intervals.

In the television signal encoder device, the A/D converter 13 produces the PCM video signal with the successive input samples of the PCM video signal divided from the PCM signal. In the PCM video signal, each video signal block consists of a predetermined number of successive input samples.

The block discriminating circuit 51 discriminates in the PCM video signal whether or not each video signal block includes an objectionable input sample having a sample level which is higher than the highest original level X(H) when the predetermined offset signal of the forward offset level is addded to the PCM video signal, namely, which would undesiredly be clipped in the amplitude limited signal at the highest limited level equal to the highest original level minus the maximum quantization noise level K. Whenever such an objectionable block is found, the block discriminating circuit 51 delivers an objectionable block presence signal to the forward offset circuit 45 and to the code converter 17 to indicate appearance of the objectionable block.

Responsive to the objectionable block presence signal, the forward offset circuit 45 adds to the objectionable block the predetermined offset signal with sign of the forward offset level inverted. That is, the forward offset circuit 45 decrements the predetermined offset signal from the objectionable block. This keeps the PCM video signal always in the limited dynamic range even if amplitude limited with the forward offset given.

Throughout each of the video signal intervals in which the objectionable block or blocks are present, the code converter 17 encodes the objectionable block presence signal as by run length encoding into an output presence signal in the encoder device output signal. Incidentally, each video signal block should have a suitable length or area which may be empirically decided so that too many bits may be uncecessary for the output presence signal.

Like in the television signal encoder device described in conjunction with FIG. 2, the forward offset circuit 45 adds the predetermined offset signal to the horizontal synchronizing signals with the sign kept as it is. This addition is carried out during the synchronizing signal intervals while subtraction of the predetermined offset signal is dealt with for the PCM video signal at an interval in which each objectionable block is located. This addition of the forward offset level to the synchronizing signals and corresponding subtraction in the television signal decoder will no more be described in the example which is being illustrated.

In the television signal decoder device, the code inverter 35 reproduces from the decoder device input signal the output presence signal as a received presence signal for delivery to the first circuit input terminal of the inverse offset circuit 49. In the manner described before, the decoding adder 37 delivers the predictive decoded signal to the second circuit input terminal of the inverse offset circuit 49.

In the predictive decoded signal, the received presence signal indicates each reproduction of the objectionable block. Responsive to the received presence signal, the inverse offset circuit 49 subtracts the predetermined offset signal from the reproduction of objectionable block. The D/A converter 41 produces the decoder device output signal from which the forward shift is removed from the objectionable blocks and from the synchronizing signals.

Figure 4:
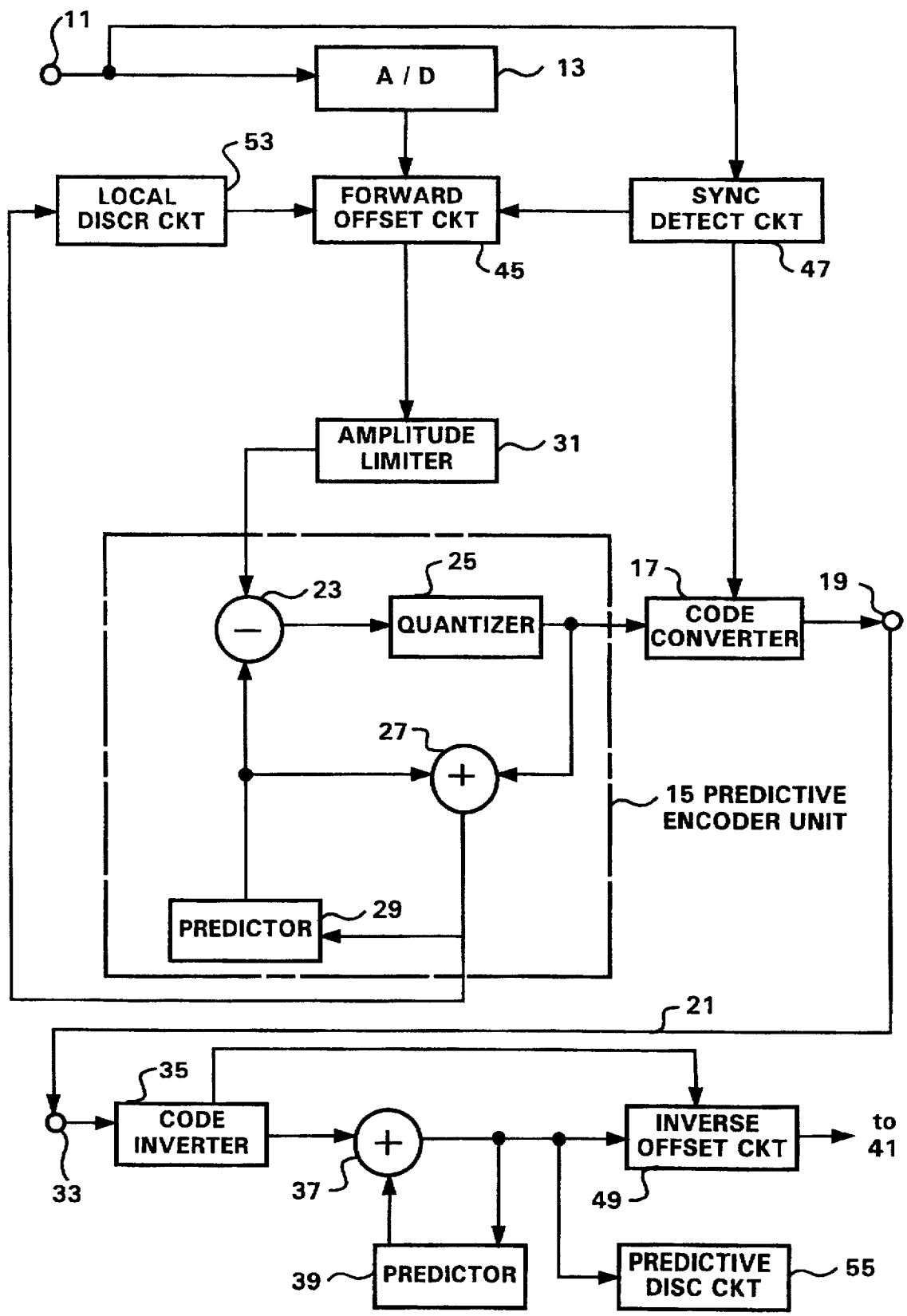
FIG. 4 is a block diagram of television signal encoder and decoder devices according to a third embodiment of this invention.

Further turning to FIG. 4 with FIGS. 1 and 2 continuously referred to, the description will proceed to television signal encoder and decoder devices according to a third preferred embodiment of this invention. Similar parts are designated by like reference numerals and are similarly operable with likewise named signals of likewise named samples and ranges or levels.

The television signal encoder device comprises a local decoded signal discriminating circuit 53 between the encoding adder 27 and the forward offset circuit 45. The television signal decoder device comprises a predictive decoded signal discriminating circuit 55 between the decoding adder 37 and a third circuit input terminal of the inverse offset circuit 49. In correspondence to this additional use of the local and the predictive decoded signal discriminating circuits 53 and 55, the forward and the inverse offset circuits 45 and 49 are operable a little different from those described in connection with FIG. 2.

In the manner described before, the PCM video signal is divided into successive input samples. The local decoded signal is divisible into successive local decoded samples. Responsive to the previous local decoded sample $y(i-1)$ corresponding to the previous input sample $x(i-1)$, the encoding predictor 29 predicts the current input sample $x(i)$.

Responsive to the previous local decoded sample, the local decoded signal discriminating circuit 55 discriminates whether or not the previous local decoded sample has an objectionable sample level of objectionable local decoded signal level lower and higher than lowest and highest allowable levels which will presently be described. The local decoded signal discriminating circuit 53 thereby delivers an offset control signal to the forward offset circuit 45 whenever the local decoded signal has the objectionable sample level.

Responsive to the offset control signal, the forward offset circuit 45 adujsts by the predetermined offset signal one of the current input samples that is preceded by each previous input sample in the limiter input signal. The offset control signal is consequently produced for this one of the current input samples in response to the previous local decoded sample. In the manner which will shortly became clear, it is possible to understand that the offset control signal accompanies the quantized signal for this one of the current input samples.

More particularly, the local decoded signal discriminating circuit 53 may calculate a summation of negative and positive predetermined values whenever the local decoded signal has its level exceeding the lowest and the highest allowable levels, respectively, until an absolute value of the summation reaches the maximum quantization noise level K. The local decoded signal discriminating circuit 53 decrements the positive and the negative predetermined values from the summation when the local decoded signal has its level within a range between lower and higher allowed levels until the summation becomes equal to zero.

The negative and the positive predetermined values may be equal in absolute value to a fourth of the maximum quantization noise level, namely, K/4. The lowest and the highest allowable levels are equal to the lowest original level plus twice the maximum quantization noise level and to the highest original level minus twice the maximum quantization noise level. The lower and the higher allowed levels may be equal to the lowest original level plus four times the maximum quantization noise level and to the highest original level minus four times the maximum quantization noise level.

Such adjustment of the forward offset level of the current input samples under consideration keeps the amplitude limited signal in the limited dynamic range and consequently the quantizer input signal, the quantized signal, and the local decoded signal in the original dynamic range. When delivered to the code converter 17, the offset control signal is encoded as by run length encoding into an output control signal in the encoder device output signal.

Along with use of the offset control signal, addition and subtraction of the forward offset level to the horizontal synchronizing signals are carried out in the television signal encoder and decoder devices. This manner of dealing with the synchronizing signals will no more be described in connection with the example being illustrated.

In the television signal decoder device, the code inverter 35 reproduces from the decoder device input signal the output control signal as a received control signal for delivery to the first circuit input terminal of the inverse offset circuit 49. In the predictive decoded signal, the decoding adder 37 produces reproductions of the successive input samples for delivery to the second circuit input terminal of the inverse offset circuit 49 and to the predictive decoded signal discriminating circuit 55. In these reproductions, current received samples are preceded by previous received samples in correspondence to the current input samples and to the previous local decoded samples, respectively. In the predictive decoded signal, the received control signal indicates one of the previous received samples and consequently one of the current received samples that corresponds to the current input sample adjusted by the forward offset level.

Supplied with the previous received samples, the predictive decoded signal discriminating circuit 55 discriminates a sample level of the last-mentioned one of the current received samples. Discriminated, the sample level will be called a reception sample level and is delivered to the third circuit input terminal of the inverse offset circuit 49. The received sample level is equal to the objectionable sample level adjusted by the forward offset level.

Responsive to the received control signal, the inverse offset circuit 49 inversely adjusts the reception sample level by the forward offset level. The D/A converter 41 produces the decoder device output signal in which the forward shift is removed from the horizontal synchronizing signals in the reproduction of the input TV signal and from those of the successive input samples in the reproduction of the PCM video signal which have their top and bottom ends undesiredly clipped in the example described with reference to FIGS. 1 through 3.

Referring afresh to FIG. 5 and again to FIGS. 1 and 2, television signal encoder and decoder devices are according to a fourth preferred embodiment of this invention. Similar parts are designated by like reference numerals and are similarly operable with likewise named signals having likewise named samples and ranges or levels.

The television signal encoder device additionally comprises between the encoding adder 27 of the predictive encoder unit 15 and the amplitude limiter 31 an encoding dynamic range defining circuit 57. Supplied from the encoding adder 27 with the local decoded signal and supplied additionally with the maximum quantization noise level K, the encoder dynamic range defining circuit 57 adaptively defines an encoder adjusted dynamic range for the quantizer 25 in the manner which will presently be described. On amplitude limiting the input digital TV signal of the original dynamic range into the amplitude limited signal of the limited dynamic range, the amplitude limiter 31 determines the limited dynamic range adaptively dependent on the encoder adjusted dynamic range as will also be presently described.

The encoder adjusted dynamic range and the limited dynamic range adaptively dependent thereon will be described with the horizontal and the vertical synchronizing signals put out of consideration for the time being. In the manner repeatedly mentioned in the foregoing. The PCM video signal is divided into successive input samples. When the quantizer 25 produces the quantized signal in Connection with the current input sample x(i) of the prediction difference signal, the encoding adder 27 produces the local decoded signal with the previous local decoded sample y(i−1). It will first be surmised that the original dynamic range is between the lowest X(L) and the highest X(H) original levels which are typically the levels "−128" and "127".

Depending on the previous local decoded sample, the encoder dynamic range defining circuit 57 defines the encoder adjusted dynamic range for the current input sample with the maximum quantization noise level used in the manner described under three cases (i) to (iii). Depending on the encoder adjusted dynamic range, the amplitude limiter 31 applies the limited dynamic range to the current input sample as specified following the encoder adjusted dynamic range. It should be noted in connection with the three cases that the word "sample" is used instead of the expression "level of the sample" and that the maximum quantization noise level is written by K.

(i) When the previous local decoded sample is lower than minus K, the encoder adjusted dynamic range is between the lowest original level minus K and the highest original level minus K. The limited dynamic range is between the lowest original level and the highest original level minus twice K.

(ii) When the previous local decoded sample is higher than plus K, the encoder adjusted dynamic range is between the lowest original level plus K and the highest original level plus K. The limited dynamic range is between the lowest original level plus twice K and the highest original level.

(iii) When the previous local decoded sample has an absolute value which is equal or less than K, the encoder adjusted dynamic range is between the lowest original level plus the previous local decoded sample and the highest original level plus the previous local decoded sample. The limited dynamic range is between three-term algebraic sums of the lowest original level plus the previous local decoded sample plus K and of the highest original level plus the previous local decoded sample minus K.

In connection with the above-mentioned three cases, it should be noted that the previous local decoded sample depends on the previous input sample x(i−1) and that the following holds true. When the previous input sample has a low level, the encoder adjusted dynamic range is shifted downwards so that the lowest limited level becomes equal to the lowest original level. When the previous input sample has a high level, the encoder adjusted dynamic range is shifted upwards so that the highest limited level becomes equal to the highest original level. In other words, let a sinusoidal signal be delivered to the A/D converter 13 with a full range of the original dynamic range. Using the encoder adjusted dynamic range, the limited dynamic range is forced to follow the sinusoidal signal so as to always cover the successive input samples. As a result, the limited dynamic range never clips the sinusoidal signal.

Figure 5:
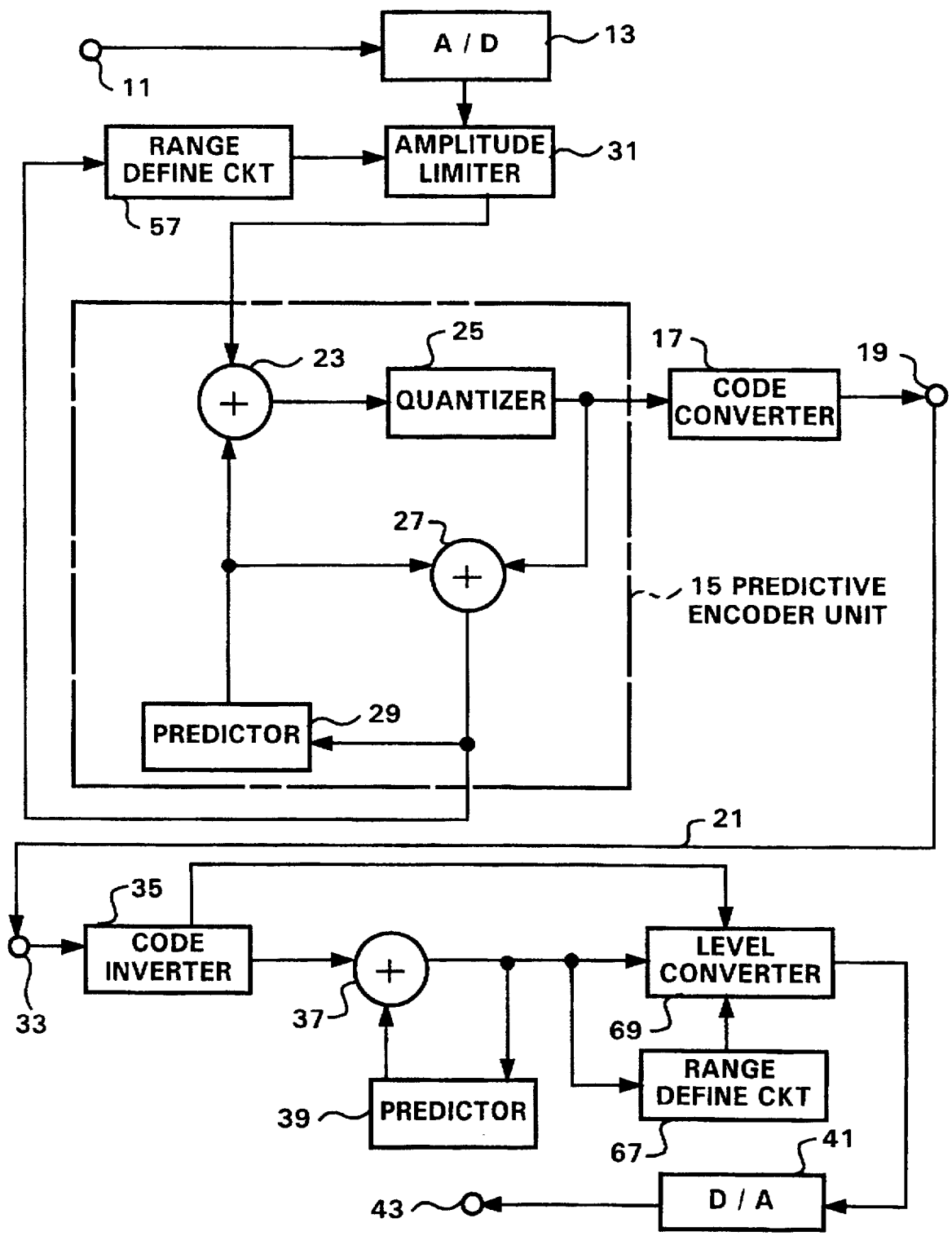
FIG. 5 is a block diagram of television signal encoder and decoder devices according to a fourth embodiment of this invention.
Figure 6:
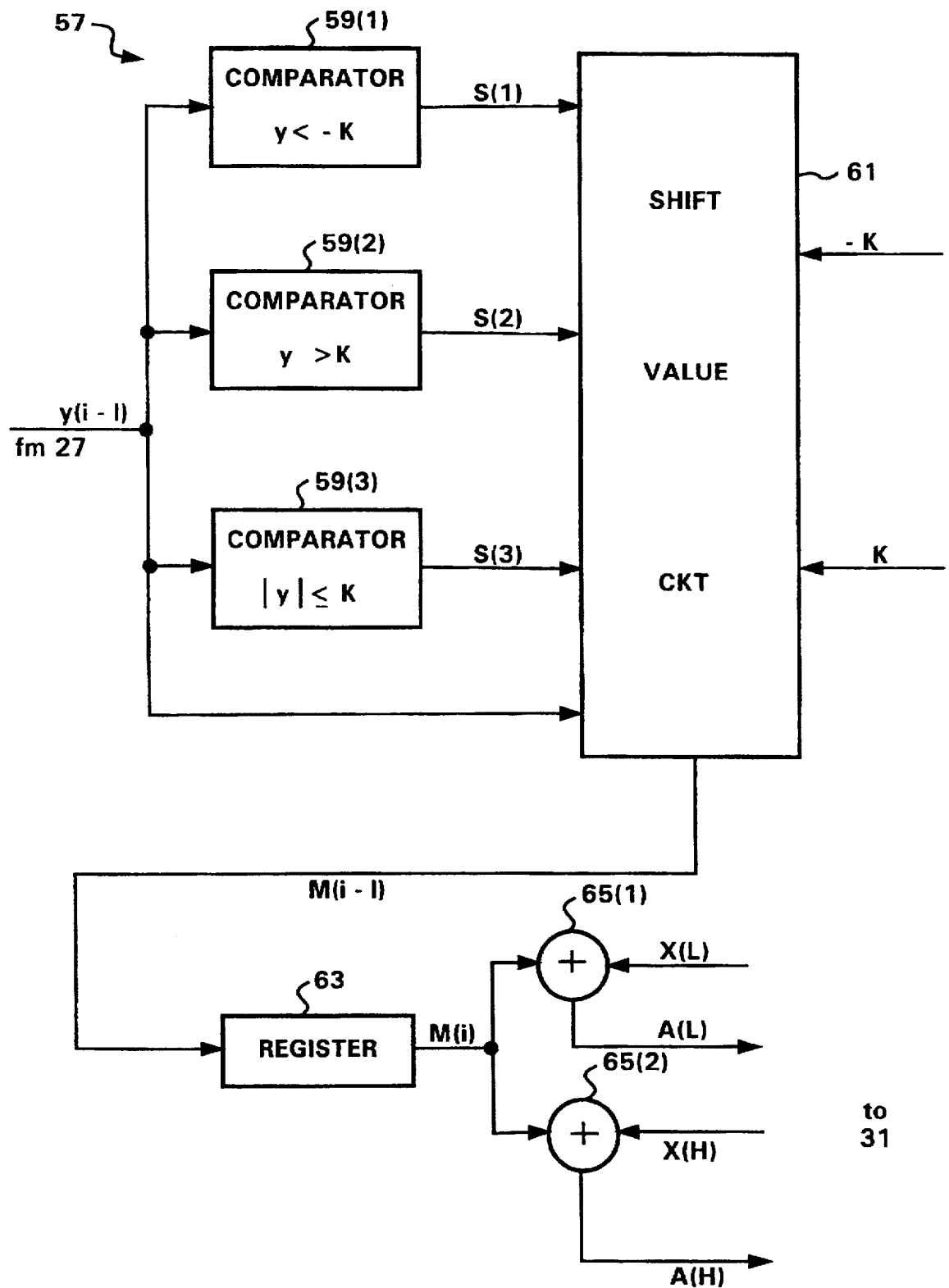
FIG. 6 is a block diagram of a range defining circuit for use in the television signal encoder device illustrated in FIG. 5.

Referring temporarily to FIG. 6 with FIG. 5 continuously referred to, the encoder dynamic range defining circuit 57 is operable under the circumstances described above. In the encoder dynamic range defining circuit 57, each previous local decoded sample y(i–1) is delivered at a time from the encoding adder 27 to first through third comparators 59(1), 59(2), and 59(3) and to a range shift value circuit 61. Each of the comparators 59 (suffixes 1 to 3 omitted) compares the previous local decoded sample with the maximum quantization noise level K with their plus and minus signs selected in the manner indicated in respective blocks.

The first through the third comparators 59 deliver to the range shift value circuit 61 first through third result signals S(1), S(2), and S(3), which have a high S(H) and a low S(L) level when the previous local decoded sample is in the cases (i) through (iii) and otherwise, respectively. The range shift value circuit 61 is supplied with two reference signals representative of minus and plus K. Responsive to the first through the third result signals of the high value, the range shift value circuit 61 produces, as a previous shift value M(i–1), the plus and the minus K and the previous local decoded sample, respectively.

Connected to the range shift value circuit 61, a register 63 holds the previous shift value during one sample interval to produce a current shift value M(i). Connected to the register 63, first and second adders 65(1) and 65(2) are supplied with the highest X(H) and the lowest X(L) original levels, respectively, and are connected to the amplitude limiter 31. When supplied with the current shift value, the first and the second adders 65 (suffixes omitted) supplies the amplitude limiter 31 with the encoder adjusted dynamic range between the lowest and the highest adjusted levels A(L) and A(H) which are equal to X(L) plus M(i) and to X(H) plus M(i), namely, the lowest and the highest original levels adjusted by the current shift value in the manner described in the cases (i) through (iii).

Turning back to FIG. 5 with FIGS. 1 and 2 once again referred to, the television signal decoder device additionally comprises a decoder dynamic range defining circuit 67 supplied from the decoding adder 37 with the predictive decoded signal and additionally with the maximum quantization noise level K. Executing addition modulo n bits, the decoding adder 37 produces the predictive decoded signal in n bits. Like the encoder dynamic range defining circuit 57, the decoder adjusted dynamic range defining circuit 67 defines a decoder adjusted dynamic range between the lowest and the highest adjusted levels, which are described above and are now for the predictive decoded signal.

Having a converter input terminal supplied with the decoder adjusted dynamic range from the decoder dynamic range defining circuit 67, a level converter 69 has a converter output terminal connected to the D/A converter 41. Responsive to the decoder adjusted dynamic range, the level converter 69 converts the predictive decoded signal into a level converted signal for delivery to the D/A converter 41, which produces the decoder device output signal.

In the manner described in conjunction with FIG. 4, the decoding adder 37 produces successive received samples including the previous and the current received samples. When the current received sample is produced in the predictive decoded signal, the decoding predictor 39 produces a previous decoder predicted sample which is used in the previous received sample.

Being reproductions of the local decoded signal and the current input and the previous local decoded samples, each of the predictive decoded signal and the current received and the previous decoder predicted samples is in the original dynamic range of n bits. The quantized signal and the local decoded signal have, however, by nature the wider dynamic range mentioned in connection with FIG. 1. It is understood by reference to the cases (i) through (iii) described before that each of the quantized signal, the local decoded signal, and the current input and the previous local decoded sample is represented by n bits which are primarily a lower n-bit part among (n+1) or more bits in the wider dynamic range.

Responsive to the predictive decoded signal and to the maximum quantization noise level, the decoder dynamic range defining circuit 67 defines the decoder adjusted dynamic range in the wider dynamic range. Referring to the decoder adjusted dynamic range, the level converter 69 converts the sample levels of the current received samples optimally in the original dynamic range of n bits.

It is possible with the encoder and the decoder dynamic range defining circuits 57 and 67 and with the level converter 69 to deal additionally with the undesirable clipping of the tip ends of synchronizing signals. The television signal encoder and the decoder devices being illustrated are moreover advantageous in that no other information is necessary on reproducing the input TV signal, such as the output interval signal, the output presence signal, and the output control signal.

The encoding and the decoding predictors 29 and 39 will be reviewed. In order to produce the encoder and the decoder predicted signals, the encoding and the decoding predictors 29 and 39 are supplied with the local and the predictive decoded signals of the original dynamic range as they are. This is merely for simplicity of their hardware structures and gives the encoder predicted signal only a negligible error in the manner discussed by Bostelmann. This applies to the predictive decoded signal.

It is possible to thoroughly avoid occurrence of this negligible error at the expense of the hardware structure by using the local and the predictive decoded signals of the wider dynamic range. After correctly and exactly produced, the encoder and the decoder predicted signals are used to provide correct and exact predictions difference signal and correct and exact predictive decoded signal. It is readily possible to use the encoder and the decoder dynamic range defining circuits 57 and 67 in producing the correct and exact prediction difference and predictive decoded signals.

For the encoder and the decoder dynamic range defining circuits 57 and 67, the original dynamic range may be between the levels "0" and "255" of eight bits. Even in this event, the television signal encoder and decoder devices are not different from those illustrated with reference to FIG. 5.

In the predictive encoder unit 15, the subtracter 23 produces the prediction difference signal which has in theory negative and positive values between the levels "–256" and "255" of nine bits. The quantizer 25 produces the quantized signal variable, with the sign bit omitted, between the levels "0" and "255" of eight bits which are eight lower bits of the nine bits. It is nevertheless possible in the television signal decoder device to uniquely reproduce with no ambiguity the predictive decoded signal in the original dynamic range.

In the manner described before, the quantization characteristic is selected in the original dynamic range between the levels "0" and "255" of eight bits. When the $2^n$ complements are used with the sign bit omitted, values between the levels "–128" and "–1" in nine bits correspond to values between the levels "128" and "255" when attention is directed to eight lower bits. As a consequence, the quantization characteristic for the prediction difference signal of the original dynamic range between the levels "0" and "255" of eight bits is determined in correspondence to a first characteristic for the prediction difference signal of an eight lower bit portion between the levels "0" and "127" brought into correspondence to a positive value between the levels "0" and "127" and to a second characteristic for the prediction difference signal of an eight higer bit portion between the levels "128" and "255" brought into correspondence to a negative value between the levels "–128" and "–1". When the above-exemplified companding law is applied, the quantization characteristic for the prediction difference signal between the levels "0" and "255" is identical with that for the prediction difference signal in which the eight lower bit portion is given by the positive value between the levels "0" and "127" and the eight lower bit portion is given by the negative value represented by the $2^n$ complements between the levels "–128" and "127".

While this invention has thus far been described in specific conjunction with several preferred embodiments thereof, it will now be readily possible for one skilled in the art to put this invention into practice in various other manners. For example, it is possible to omit the A/D and the D/A converters 13 and 41 when the original pictures should be reproduced on a digital TV receiver. The input TV signal may be a monochromatic or color TV signal other than the NTSC color TV signal.

What is claimed is:

1. A television signal encoder device comprising:
   delivering means for delivering as a limiter input signal an input digital television signal having a predetermined dynamic range between lowest and highest original levels, and adding a predetermined offset signal of a forward offset level adaptively to said input digital television signal to give said limiter input signal a forward offset dynamic range between said lowest original level plus said forward offset level and a highest limited level, said delivering means comprising a synchronizing signal detector for detecting horizontal synchronizing signal intervals in said input digital television signal to produce a synchronizing signal interval signal indicative of said horizontal synchronizing signal intervals and a forward offset circuit responsive to said synchronizing signal interval signal for adding said predetermined offset signal to said input digital television signal to give said forward offset dynamic range to said limiter input signal;
   an amplitude limiter for amplitude limiting said limiter input signal into an amplitude limited signal having a limited dynamic range between a lowest limited level and said highest limited level; and
   a predictive encoder unit for predictive encoding said amplitude limited signal with quantization into a quantized signal accompanied by quantization noise having a maximum quantization noise level to have altogether said predetermined dynamic range for use as an encoder device output signal, wherein said delivering means adaptively gives a forward shift to said input digital television signal to keep a lowest level of said amplitude limited signal at said lowest limited level and to make said encoder device output signal have the predetermined dynamic range subjected to said forward shift.

2. A television signal encoder device as claimed in claim 1, wherein said forward offset level is equal to said maximum quantization noise level.

3. A television signal encoder device as claimed in claim 1, wherein:
   said delivering means further comprises a block discriminating circuit for discriminating, whether or not each video signal block of said input digital television signal comprises an objectionable input sample having a sample level higher than said highest original level when said forward offset level is given to said video signal block, to deliver an objectionable block presence signal to said forward offset circuit;
   said forward offset circuit reducing in response to said objectionable block presence signal said forward offset level from the video signal block including said objectionable input sample.

4. A television signal encoder device as claimed in claim 3 wherein said forward offset level is equal to said maximum quantization noise level.

5. A television signal encoder device as claimed in claim 1 said delivering means delivering said input digital television signal as said limiter input signal with an input video signal of said input digital television signal divided successively into current input samples, said predictive encoder unit producing in addition to said quantized signal in connection with said current input samples and with synchronizing signals of said input digital television signal a local decoded signal in connection with previous input samples preceding said current input samples, respectively; wherein:
   said delivering means further comprises local decoded signal discriminating circuit responsive to said local decoded signal for discriminating, whether or not said local decoded signal has an objectionable decoded signal level lower and higher than lowest and highest allowable levels, to deliver an offset control signal to said forward offset circuit whenever said local decoded signal has said objectionable decoded signal level;
   said forward offset circuit adding in response to said offset control signal said predetermined offset level on producing said limiter input signal to one of said current input samples that precedes one of said previous input samples in connection with which said local decoded signal is produced with said objectionable decoded level.

6. A television signal encoder device as claimed in claim 5 wherein:
   said local decoded signal discriminating circuit produces said offset control signal by calculating a summation of negative and positive predetermined values whenever said local decoded signal exceeds said lowest and said highest allowable levels, respectively, until an absolute value of said summation reaches said maximum quantization noise level and by decrementing said positive and said negative predetermined values from said summation until said summation becomes equal to zero whenever said local decoded signal is within a range between lower and higher allowed levels;
   said forward offset circuit using said offset control signal as said predetermined offset signal.

7. A television signal encoding device as claimed in claim 6 wherein:
   said negative and said positive predetermined values are equal in absolute value to a fourth of said maximum quantization noise level;
   said lowest and said highest allowable levels being equal to said lowest original level plus twice said maximum quantization noise level and to said highest original level minus twice said maximum quantization noise level;
   said lower and said higher allowed levels being equal to said lowest original level plus four times said maximum quantization noise level and to said highest original level minus four times said maximum quantization noise level.

8. A television signal encoder device comprising:

delivering means for delivering as a limiter input signal an input digital television signal having a predetermined dynamic range between lowest and highest original levels, said delivering means delivering said input digital television signal as said limiter input signal with an input video signal of said input digital television signal divided into successive input samples;

an amplitude limiter for amplitude limiting said limiter input signal into an amplitude limited signal having a limited dynamic range between lowest and highest limited levels; and a predictive encoder unit for predictive encoding said amplitude limited signal with quantization into a quantized signal accompanied by quantization noise having a maximum quantization noise level to have altogether said predetermined dynamic range for use as an encoder device output signal, said delivering means adaptively gives a forward shift to said input digital television signal to keep a lowest level of said amplitude limited signal at said lowest limited level and to make said encoder device output signal have the predetermined dynamic range subjected to said forward shift, and said predictive encoder unit producing in addition to said quantized signal at a time instant in connection with a current input sample of said successive input samples and during different time intervals in connection with synchronizing signals of said input digital television signal a local decoded signal including at said time instant a previous local decoded sample; and an encoder dynamic range defining circuit responsive to said local decoded signal and to said maximum quantization noise level for defining an encoder adjusted dynamic range adaptively dependent on said previous local decoded sample, said amplitude limiter using said encoder adjusted dynamic range in determining said limited dynamic range for said current input sample.

9. A television signal encoder device as claimed in claim 8, said local decoded signal having a local decoded signal level dependent on said previous local decoded sample, wherein said encoder adjusted dynamic range is, when said local decoded signal level is not higher in absolute value than said maximum quantization noise level, between three-term algebraic sums of said lowest original level plus said local decoded signal level plus said maximum quantization noise level and of said lowest original level plus said local decoded signal level minus said maximum quantization noise level.

10. A television signal encoder device as claimed in claim 9, wherein said encoder adjusted dynamic range is, when said local decoded signal level is lower than minus said maximum quantization noise level, between said lowest original level and said highest original level minus twice said maximum quantization noise level and, when said local decoded signal level is higher than plus said maximum quantization noise level, between said lowest original level plus twice said maximum quantization noise level and said highest original level.

11. A television signal decoder device for decoding a decoder device input signal which is produced as an encoder device output signal by a television signal encoder device which comprises delivering means for delivering as a limiter input signal an input digital television signal having a predetermined dynamic range between lowest and highest original levels, an amplitude limiter for amplitude limiting said limiter input signal into an amplitude limited signal having a limited dynamic range between lowest and highest limited levels, and a predictive encoder unit for predictive encoding said amplitude limited signal with quantization into a quantized signal accompanied by quantization noise having a maximum quantization noise level to have altogether said predetermined dynamic range for use as said encoder device output signal and into a local decoded signal, said television signal decoder device comprising:

a predictive decoder for predictive decoding said decoder device input signal to produce a reproduction of said local decoded signal as a predictive decoded signal having said predetermined dynamic range: and processing means for processing said predictive decoded signal into a decoder device output signal, said delivering means adaptively giving a forward shift to said input digital television signal to keep a lowest level of said amplitude limited signal at said lowest limited level and to make said encoder device output signal have the predetermined dynamic range subjected to said forward shift, wherein said processing means produces said decoder device output signal in said predetermined dynamic range as a reproduction of said input digital television signal with said forward shift removed, said delivering means detecting horizontal synchronizing signal intervals in said input digital television signal to produce a synchronizing signal interval signal indicative of said horizontal synchronizing signal intervals and to make said decoder device output signal include said synchronizing signal interval signal as an output interval signal and giving in response to said synchronizing signal interval signal a forward offset level to said input digital television signal, wherein:

said predictive decoder produces in response to said output interval signal a received interval signal indicative of said horizontal synchronizing signal intervals in said predictive decoded signal; and said processing means comprising an inverse offset circuit responsive to said received interval signal for removing said forward offset level from said predictive decoded signal to produce said decoder device output signal with said forward shaft removed.

12. A television signal decoder device for decoding a decoder device input signal which is produced as an encoder device output signal by a television signal encoder device which comprises delivering means for delivering as a limiter input signal an input digital television signal having a predetermined dynamic range between lowest and highest original levels, an amplitude limiter for amplitude limiting said limiter input signal into an amplitude limited signal having a limited dynamic range between lowest and highest limited levels, and a predictive encoder unit for predictive encoding said amplitude limited signal with quantization into a quantized signal accompanied by quantization noise having a maximum quantization noise level to have altogether said predetermined dynamic range for use as said encoder device output signal and into a local decoded signal, said television signal decoder device comprising:

a predictive decoder for predictive decoding said decoder device input signal to produce a reproduction of said local decoded signal as a predictive decoded signal having said predetermined dynamic range; and processing means for processing said predictive decoded signal into a decoder device output signal, said delivering means adaptively giving a forward shift to said input digital television signal to keep a lowest level of said amplitude limited signal at said lowest limited level and to make said encoder device output signal have the predetermined dynamic range subjected to said forward shift, wherein said processing means produces said decoder device output signal in said predetermined dynamic range as a reproduction of said input digital television signal with said forward shift removed, said input digital television signal including video signal blocks, said delivering means discriminating in said video signal blocks an objectionable block including an input sample, having, when said forward shift is given to said video signal blocks a sample level higher than said highest original level to produce an objectionable block presence signal and to make said encoder device output signal include said objectionable block presence signal as an output presence signal and reducing in response to said objectionable block presence signal said forward shift from said objectionable block, wherein:

said predictive decoder produces in response to said output presence signal a received presence signal in said predictive decoded signal; and said processing means comprises an inverse offset circuit responsive to said received presence signal for adding said forward shift to said predictive decoded signal to produce said decoder device output signal with removal of reduction of said forward shift.

13. A television signal decoder device for decoding a decoder device input signal which is produced as an encoder device output signal by a television signal encoder device which comprises delivering means for delivering as a limiter input signal an input digital television signal having a predetermined dynamic range between lowest and highest original levels, an amplitude limiter for amplitude limiting said limiter input signal into an amplitude limited signal having a limited dynamic range between lowest and highest limited levels, and a predictive encoder unit for predictive encoding said amplitude limited signal with quantization into a quantized signal accompanied by quantization noise having a maximum quantization noise level to have altogether said predetermined dynamic range for use as said encoder device output signal and into a local decoded signal, said television signal decoder device comprising:

a predictive decoder for predictive decoding said decoder device input signal to produce a reproduction of said local decoded signal as a predictive decoded signal having said predetermined dynamic range; and processing means for processing said predictive decoded signal into a decoder device output signal, said delivering means adaptively giving a forward shift to said input digital television signal to keep a lowest level of said amplitude limited signal at said lowest limited level and to make said encoder device output signal have the predetermined dynamic range subjected to said forward shift, wherein said processing means produces said decoder device output signal in said predetermined dynamic range as a reproduction of said input digital television signal with said forward shift removed, said input digital television signal including a video signal divided into successive input samples, said predictive encoder unit producing at a time instant said quantized signal in connection with a current input sample of said successive input samples, said local decoded signal including at said time instant a previous local decoded sample used in predicting said current input sample, said delivering means comprising a local decoded signal discriminating circuit responsive to said local decoded signal for producing an offset control signal when said previous local decoded signal has a decoded sample level lower and higher than lowest and highest allowable levels, said amplitude limiter using said offset control signal in giving said forward shift to said current input sample and in making said predictive encoder unit produce said offset control signal in said encoder device output signal as an output control signal, wherein said predictive decoder producing in response to said output control signal a received control signal in said predictive decoded signal in addition to a current received sample and a previous received sample corresponding to said current input sample and to said previous local decoded sample; said processing means comprising a predictive decoded signal discriminating circuit responsive to said received control signal for producing a received sample level of said current received sample, and an inverse offset circuit responsive to said received control signal and to said received sample level for removing said forward shift from said current received sample to produce said decoder device output signal with said forward shift removed.

14. A television signal decoder device for decoding a decoder device input signal which is produced as an encoder device output signal by a television signal encoder device which comprises delivering means for delivering as a limiter input signal an input digital television signal having a predetermined dynamic range between lowest and highest original levels, said delivering means producing collectively as a video signal of said input digital television signal successive input samples including at an encoder time instant a current input sample, an amplitude limiter for amplitude limiting said limiter input signal into an amplitude limited signal having a limited dynamic range between lowest and highest limited levels, and a predictive encoder unit for predictive encoding said amplitude limited signal with quantization into a quantized signal accompanied by quantization noise having a maximum quantization noise level to have altogether said predetermined dynamic range for use as said encoder device output signal and into a local decoded signal, said local decoded signal including at said encoder time instant a previous local decoded sample used in predicting said current input sample, an encoder dynamic range defining circuit responsive to said local decoded signal and said maximum quantization noise level for defining an encoder adjusted dynamic range adaptively dependent on said previous local decoded sample, said amplitude limiter using said encoder adjusted dynamic range as said limited dynamic range in giving said forward shift to said current input sample, said television signal decoder device comprising:

a predictive decoder for predictive decoding said decoder device input signal to produce a reproduction of said local decoded signal as a predictive decoded signal having said predetermined dynamic range; and processing means for processing said predictive decoded signal into a decoder device output signal, said delivering means adaptively giving a forward shift to said input digital television signal to keep a lowest level of said amplitude limited signal at said lowest limited level and to make said encoder device output signal have the predetermined dynamic range subjected to said forward shift, wherein said processing means produces said decoder device output signal in said predetermined dynamic range as a reproduction of said input digital television signal with said forward shift removed, said predictive decoder producing said predictive decoded signal including at a decoder time instant a current received sample and a previous received sample in correspondence to said current input sample and said previous local decoded sample, said processing means comprising a decoder dynamic range defining circuit responsive to said predictive decoded signal for defining a decoder adjusted dynamic range corresponding to said encoder adjusted dynamic range, and a level converter responsive to said decoder adjusted dynamic range for removing said forward shift from said current received sample to produce said decoder device output signal with said forward shift removed.

15. A television signal decoder device for decoding a decoder device input signal which is produced as an encoder device output signal by a television signal encoder device which comprises delivering means for delivering as a limiter input signal an input digital television signal having a predetermined dynamic range between lowest and highest original levels, an amplitude limiter for amplitude limiting said limiter input signal into an amplitude limited signal having a limited dynamic range between lowest and highest limited levels, and a predictive encoder unit for predictive encoding said amplitude limited signal with quantization into a quantized signal accompanied by quantization noise having a maximum quantization noise level to have altogether said predetermined dynamic range for use as said encoder device output signal and into a local decoded signal, said television signal decoder device comprising:

a predictive decoder for predictive decoding said decoder device input signal to produce a reproduction of said local decoded signal as a predictive decoded signal having said predetermined dynamic range; and processing means for processing said predictive decoded signal into a decoder device output signal, said delivering means adaptively giving a forward shift to said input digital television signal to keep a lowest level of said amplitude limited signal at said lowest limited level and to make said encoder device output signal have the predetermined dynamic range subjected to said forward shift, wherein said processing means produces said decoder device output signal in said predetermined dynamic range as a reproduction of said input digital television signal with said forward shift removed;

wherein said predictive decoded signal has a predictive decoded signal level which is dependent on a previous received sample; wherein a decoder adjusted dynamic range is between three-term algebraic sums of said lowest original level plus said predictive decoded signal level plus said maximum quantization noise level when said predictive decoded signal level is higher in absolute value than said maximum quantization noise level, and is between three-term algebraic sums of said lowest original level plus said predictive decoded signal level minus said maximum quantization noise level when said predictive decoded signal level is not higher in absolute value than said maximum quantization noise level; wherein said decoder adjusted dynamic range is between said lowest original level and said highest original level minus twice said maximum quantization noise level, when said predictive decoded signal level is lower than minus said maximum quantization noise level; and wherein said decoder adjusted dynamic range is between said lowest original level plus twice said maximum quantization noise level and said highest original level, when said predictive decoded signal level is higher than plus said maximum quantization noise level.

* * * * *